May 10, 1938.    G. M. GOUSE    2,117,060
DOOR HOLDER
Filed June 9, 1937    2 Sheets-Sheet 1
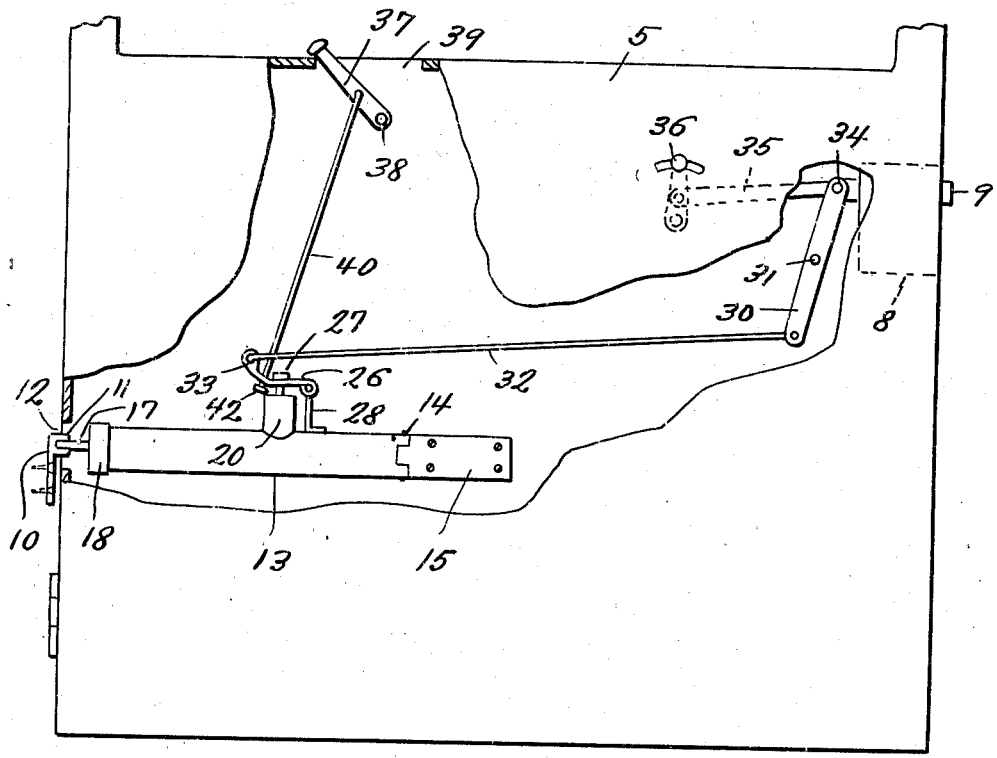
Fig. 1.
Fig. 2.
Inventor
Glen Mathias Gouse
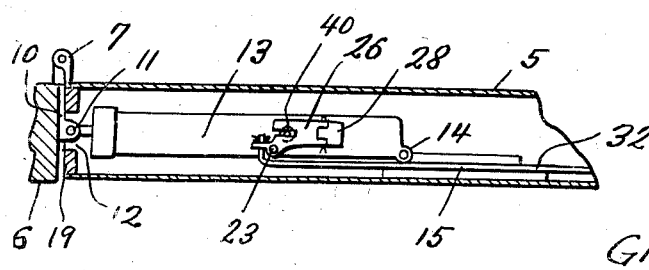
Attorneys

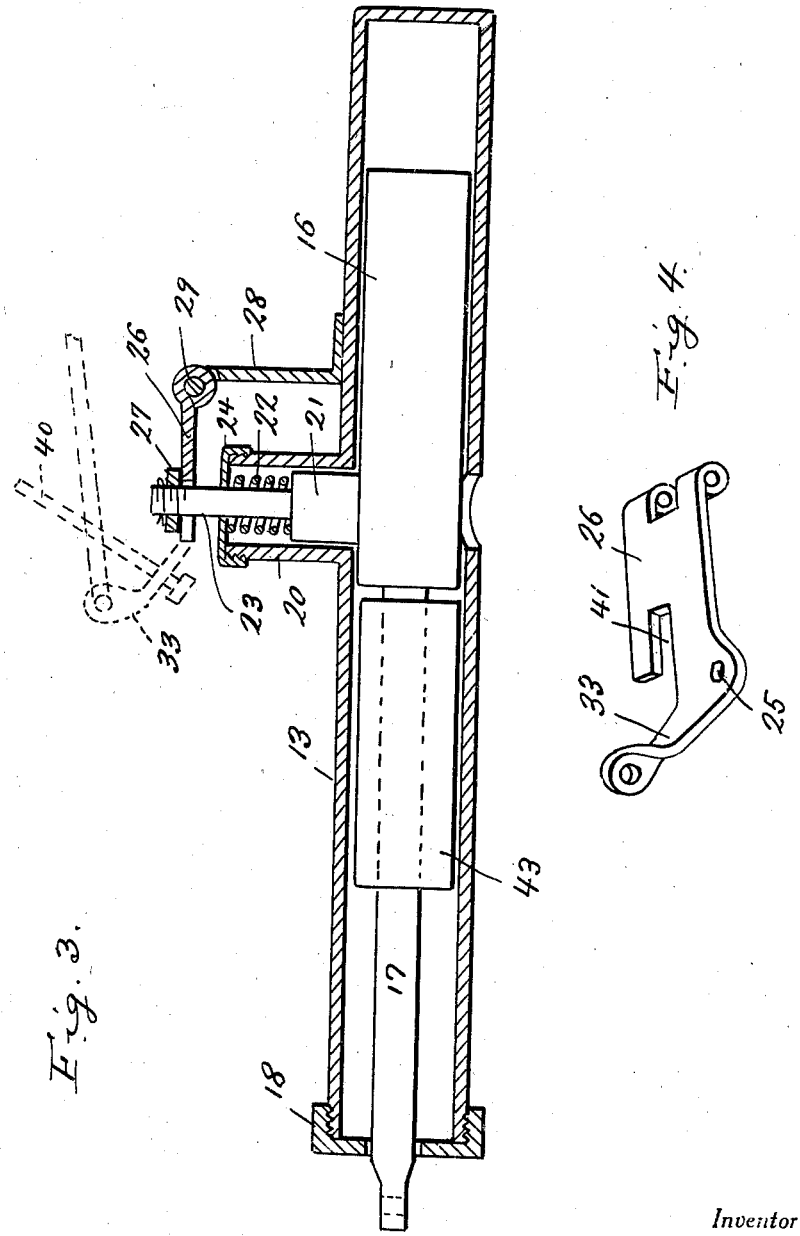

Patented May 10, 1938

2,117,060

UNITED STATES PATENT OFFICE 2,117,060

DOOR HOLDER

Glen M. Gouse, Carlisle, Pa.

Application June 9, 1937, Serial No. 147,362

1 Claim. (Cl. 16—82)

This invention has reference to means for holding a door in open position, and the object of the invention is to provide a device of this character particularly designed for use in securing an automobile door in open position.

As is well known, it sometimes occurs, when one is entering an automobile, that the door swings and impinges against the foot, sometimes with injurious consequences.

Also, at times it is desired to secure an automobile door in an open or partially open position for ventilation purposes or otherwise.

It is therefore an object of the present invention to equip an automobile door in such a manner that when the same is swung to an open position it will be secured in said open position without requiring particular attention of the person entering or leaving the automobile, whereby injury resulting as above may be obviated, and when desired, the door may be held in open position for ventilation purposes or the like.

The invention, together with its objects and advantages, will be best understood from a study of the following description taken in connection with the accompanying drawings, wherein:

Figure 1 is a fragmentary elevational view of an automobile door with certain parts broken away illustrating the application of the invention thereto.

Figure 2 is a fragmentary detail sectional view taken through the well or lower portion of the door.

Figure 3 is a longitudinal sectional view through the door holder; and

Figure 4 is a perspective view of a lever hereinafter more fully referred to.

Referring to the drawings by reference numerals, it will be seen that 5 indicates generally the well or hollow lower portion of a door, while the reference numeral 6 indicates the edge of the automobile body to which the door is hinged in a conventional manner, as indicated generally at 7.

The door, as shown in Figure 1, is provided with a suitable lock indicated generally by the reference numeral 8, which includes a sliding bolt 9.

In accordance with the present invention, there is mounted on the edge 6 of the frame body a bracket or plate 10 provided with a pair of ears 11 adapted to be accommodated within a slot 12 provided in the edge of the door 5.

Arranged within the well of the door 5 is a cylinder 13 which at one end is hinged as at 14 to an attaching plate 15 riveted or otherwise suitably secured fixedly within the well of the door.

Working within the cylinder 13 is a piston or plunger 16 equipped with a rod 17 that works through an opening in the cap 18 of cylinder 13 and is provided at its free end for disposition between the ears 11 and for accommodating a pivot pin 19 through the medium of which the plunger rod 17 is pivoted to the plate 10.

Rising vertically from the cylinder 13 is a tubular housing or guide 20 which accommodates a locking plunger 21 that is normally urged downwardly and inwardly of the cylinder 13 through a medium of a coil spring 22.

The locking plunger 21 is provided with a pin 23 that works through an opening in the cap 24 provided for the guide or plunger chamber 20, and at its upper outer end the stem 23 extends through an opening 25 provided therefor in a lever 26. Threaded on the upper end of the pin 29 is a stop nut 27.

A bracket or post 28 rises from the cylinder 13 adjacent to the guide or housing 20 and hinged to the upper end of the post or bracket 28, as at 29 is the aforementioned lever 26.

From the description of the invention thus far, it will be seen that when the door is in a closed position the parts thus described are in the positions shown in Figures 2 and 3. Manifestly, as the door 5 swings outwardly to open position, the piston 16 moves toward the clamping grip end of cylinder 13, thus permitting the locking plunger 21 under action of spring 22 to move inwardly of the cylinder 13 behind the plunger 16, whereby to secure the plunger 16 against reverse movement, and consequently the door 5 in open position.

In the present instance I have illustrated mechanism whereby the locking plunger 21 may be raised upwardly out of the path of the plunger 16 and against the action of spring 22 incidental to a retraction of the lock bolt 9. Such mechanism in the present instance, and as best shown in Figure 1, consists of a lever 30 suitably pivoted intermediate its ends as at 31 within the well of the door 5 and adjacent the lock 8. One end of the lever 30 is pivotally connected through the medium of a link 32 with an angularly offset end 33 of the plate or lever 26. At the other end thereof the lever 30 is pivoted as at 34 to the bolt 9 at the point where said bolt is pivoted to one end of a connecting link 35 that connects the inner and outer door handles 36 with the bolt 9. In the present instance only the inner door handle 36 is shown.

It will thus be seen that to release the door 5, when the latter is in open position, in order to permit the door to swing to a closed position, the operator manipulates the handle 36 in an obvious manner to retract the bolt 9. Manifestly, incidental to the retraction of the bolt 9, the lever 30 will be caused to swing on its pivot 31 in a counter-clockwise direction (as viewed in Figure 1), thus exerting a pull on the link 32. This will result in an upward pull being exerted on the lever plate 26 and consequently an upward pull being exerted on the locking plunger 21 for moving the latter out of the path of the plunger or piston 16. The piston 16 will then be free to move to the position shown in Figure 3, thus permitting the door 5 to swing to a closed position.

Thus, upon the closing of the door, the parts are set as shown in Figure 3, so that a repetition of the operation described will result, incidental to an opening of the door 5 and the securing of the door in an open position.

To render the device inactive, or in other words, to releasably secure the locking plunger 21 in a raised position so as not to interfere with the free movement of the plunger 16, to the end that the door 5 may operate in the usual manner, and to be free to swing closed after it has been opened, I provide a handle member 37 that is pivoted as at 38 within the well of the door 5 and operates in a suitable slot 39 provided in the lower wall of the window opening of the door. Suitably and pivotally connected to the button or handle 37 is a link 40 which has a free end accommodated in a slot 41 provided therefor in the lever plate 26. At said free end the rod or link 40 is provided with a head 42, and with the handle or button 37 in the position shown in Figure 1, the head 42 is spaced downwardly from the lever 26 a distance sufficient to preclude interference on the part of the head 42 with the downward movement of the locking plunger 21 to engage behind the piston 16 when such is desired, or in other words, when it is desired that the door holder should operate for securing the door in open position.

However, when it is desired that the door may swing freely to open and closed position, and without being affected by my door holder, the handle or lever 37 is swung in a clockwise direction to a position opposite to that shown in Figure 1, whereupon the head 42 will engage plate 26 and retain the plate 26 against downward swinging movement, and consequently the plunger 21 against moving downwardly and inwardly of the cylinder 13 when the door 5 is swung to open position.

To cushion the jar incidentally to the swinging movement of the door 5 to open position, and when my device is rendered inactive, there is provided on the stem 17 of piston 16, and within the cylinder 13, a tubular rubber stop 43, which, as the door 5 swings to open position, moves into contact with the cap 18 of the piston, and thereby acts as a cushion for the door as the same swings to fully open position.

It is thought that a clear understanding of the construction, utility and advantages of a device of this character will be had without a more detailed description.

Having thus described the invention, what is claimed as new is:

A door holder of the class described comprising a cylinder, means for hingedly connecting the cylinder to a door, an elongated piston in the cylinder, a rod connected with the piston and passing through an end of the cylinder and adapted to be connected to a part of a door frame, a housing connected with the cylinder and arranged at right angles thereto and opening out into the cylinder, a spring-pressed plunger in the housing engaging the piston when the piston is in one position and being projected by its spring in rear of the piston when the piston is moved to another position, a support on the cylinder, a plate-like member hinged to the support, means for connecting the member to the plunger, manually operated means for raising the plate-like member to move the plunger into its housing and manually operated means for holding the plate-like member in a position to hold the plunger in its housing, when it is desired to render the plunger inoperative.

GLEN M. GOUSE.